United States Patent
Feil et al.

[11] Patent Number: 6,153,990
[45] Date of Patent: *Nov. 28, 2000

[54] RELAY CIRCUIT FOR HIGH-VOLTAGE OPERATION OF A BI-DIRECTIONAL DC MOTOR

[75] Inventors: Paul Gregory Feil, Evansville, Ind.; Thomas Henry Vaughn, Springfield, Ill.

[73] Assignee: Siemens Electromechnical Components, Inc., Iselin, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/807,309

[22] Filed: Feb. 27, 1997

[51] Int. Cl.[7] .................................................... H02P 1/40
[52] U.S. Cl. ............................................................ 318/280
[58] Field of Search ................................. 318/280, 282, 318/444, 443, 286, 739; 361/23, 28, 29

[56] References Cited

U.S. PATENT DOCUMENTS

| | | | |
|---|---|---|---|
| 3,601,603 | 8/1971 | Hughson | 246/125 |
| 3,671,816 | 6/1972 | Ritzow | 361/193 |
| 3,864,604 | 2/1975 | Pfanzelt | 361/6 |
| 4,152,634 | 5/1979 | Penrod | 318/739 |
| 4,173,029 | 10/1979 | Rabindran | 361/3 |
| 4,301,489 | 11/1981 | Stich | 361/9 |
| 4,336,482 | 6/1982 | Goertler et al. | 318/443 |
| 4,896,084 | 1/1990 | Maue et al. | 318/280 |
| 5,510,684 | 4/1996 | Moroi et al. | 318/282 |
| 5,546,061 | 8/1996 | Okabayashi et al. | 335/378 |

FOREIGN PATENT DOCUMENTS 116 702A 12/1975 Germany.
35 16 985 8/1986 Germany.

Primary Examiner—Jonathan Salata

[57] ABSTRACT

A relay circuit is provided for operating a bi-directional dc motor including an H-bridge relay circuit having a first and a second relay. The first relay is capable of operatively engaging a first contact at a first time period to provide a first connection of the motor to a power source to operate the motor in a first mode. The second relay is capable of operatively engaging a second contact at a second time period to provide a second connection of the motor to the power source to operate the motor in a second mode. The relay circuit further includes a switch having at least one contact operatively engaging the first or second relay for effectuating the first or second connection, respectively. A third relay is operatively associated with the switch to provide a third connection of the motor to the power source as the at least one contact operatively engages the first or second relay. The third connection is disconnected prior to disconnection of the first or second connection as the at least one contact disengages the first or second relay.

17 Claims, 4 Drawing Sheets

RELAY CIRCUIT FOR HIGH-VOLTAGE OPERATION OF A BI-DIRECTIONAL DC MOTOR

BACKGROUND

1. Technical Field

The present disclosure relates generally to a motor reversing circuit. More specifically, the present disclosure relates to a motor reversing circuit for dc systems which operate at voltage levels greater than 12 volts.

2. Background of the Related Art

H-bridge motor reversing relay arrangements are commonly used in systems which require bi-directional dc motor operation. For example, an H-bridge circuit is employed in automotive systems having bi-directional motors for operating power door locks, power seats, power windows, etc. Typically, bi-directivity is achieved by the H-bridge circuit by using two single pole, double throw (SPDT) relays controlled by a forward and reverse single pole, double throw, center off switch to change the polarity of the voltage inputs to the motor to provide forward and reverse operations.

Each SPDT relay operates between a normally open (N.O.) and a normally closed (N.C.) position for supplying and cutting-off power to the motor. The load is positioned between a movable contact of each SPDT relay with the negative polarity of the voltage source on both N.C. stationary contacts and the positive polarity on both N.O. stationary contacts. Ground is provided to the N.C. contacts such that both sides of the motor windings are grounded when neither relay in the H-bridge circuit is operated.

When one of the relays of the H-bridge circuit is energized, it applies a positive voltage to one side of the motor through one of the SPDT switches (relay contacts) while the other side remains grounded through the N.C. stationary contact of the other SPDT switch (relay contacts). This causes the motor to rotate in a specific direction. If the relay is de-energized the motor discontinues operation and the motor windings are again connected to ground. If the other relay is energized it applies a positive voltage to the other side of the motor through the other SPDT switch and causes the motor to rotate in the opposite direction.

The conventional H-bridge circuit as described above works well for 12-volt dc systems. However, in higher voltage systems, such as 24-volt dc systems, which typically necessitate operation up to 32-volt dc, the H-bridge relay circuit creates an arc between the moveable contact and the N.O. stationary contact of the switch as it opens. The arc is created due to the relatively high current and high potential difference between the moveable contact and the N.O. stationary contact. Further, because the N.O. stationary contact has positive battery voltage and the N.C. stationary contact is at ground potential, a short circuit is created through the arc causing the current flow through the arc to increase, limited only by circuit impedance. The arc continues until it has melted away enough contact material to establish a sufficient gap to extinguish the arc.

Therefore, a need exists for a motor reversing circuit for operating a bi-directional motor at higher voltage levels that does not cause arcing and still provides bi-directional operation of the load.

SUMMARY OF THE INVENTION

In accordance with the present disclosure, a motor reversing circuit is provided which obviates the above problem. The disclosed circuit does this in a way that is transparent to the rest of the electrical control circuit. That is, it operates with the same circuit connections as a standard H-bridge.

Specifically, the motor reversing circuit for operating a bi-directional motor includes the standard H-bridge relay circuit which includes a first and a second relay. The first relay is capable of operatively engaging a first contact at a first time period to provide a first connection of the motor to a power source to operate the motor in a first mode. The second relay is capable of operatively engaging a second contact at a second time period to provide a second connection of the motor to the power source to operate the motor in a second mode. The motor reversing circuit further includes a switch having at least one contact operatively engaging the first or second relay for effectuating the first or second connection, respectively. A third relay is operatively associated with the switch to provide a third connection of the motor to the power source as the at least one contact operatively engages the first or second relay. Means for disconnecting the third connection are also provided to disconnect the third connection as the at least one contact disengages the first or second relay. The third connection is disconnected prior to disconnection of the first or second connection, thereby preventing arcing.

The disclosure further provides a relay circuit for operating a device in a first and a second mode. The relay circuit includes an H-bridge relay circuit having a first and a second relay operatively engaging the device and a first terminal of a power source for operating the device in the first or second mode; and a third relay operatively associated with the device and the first terminal to disconnect the power source with the device upon disengagement of the first or second relay from the first terminal and prior to disengagement of the first or second relay with the device.

The disclosed motor reversing circuit is intended for off-road equipment and heavy trucks which frequently use dc systems operating at voltage levels greater than 12 volts. However, the disclosed circuit will be useful in passenger vehicles and light trucks as these vehicles move to higher voltage power systems.

DETAILED DESCRIPTION OF PREFERRED EMBODIMENTS

Figure 1:
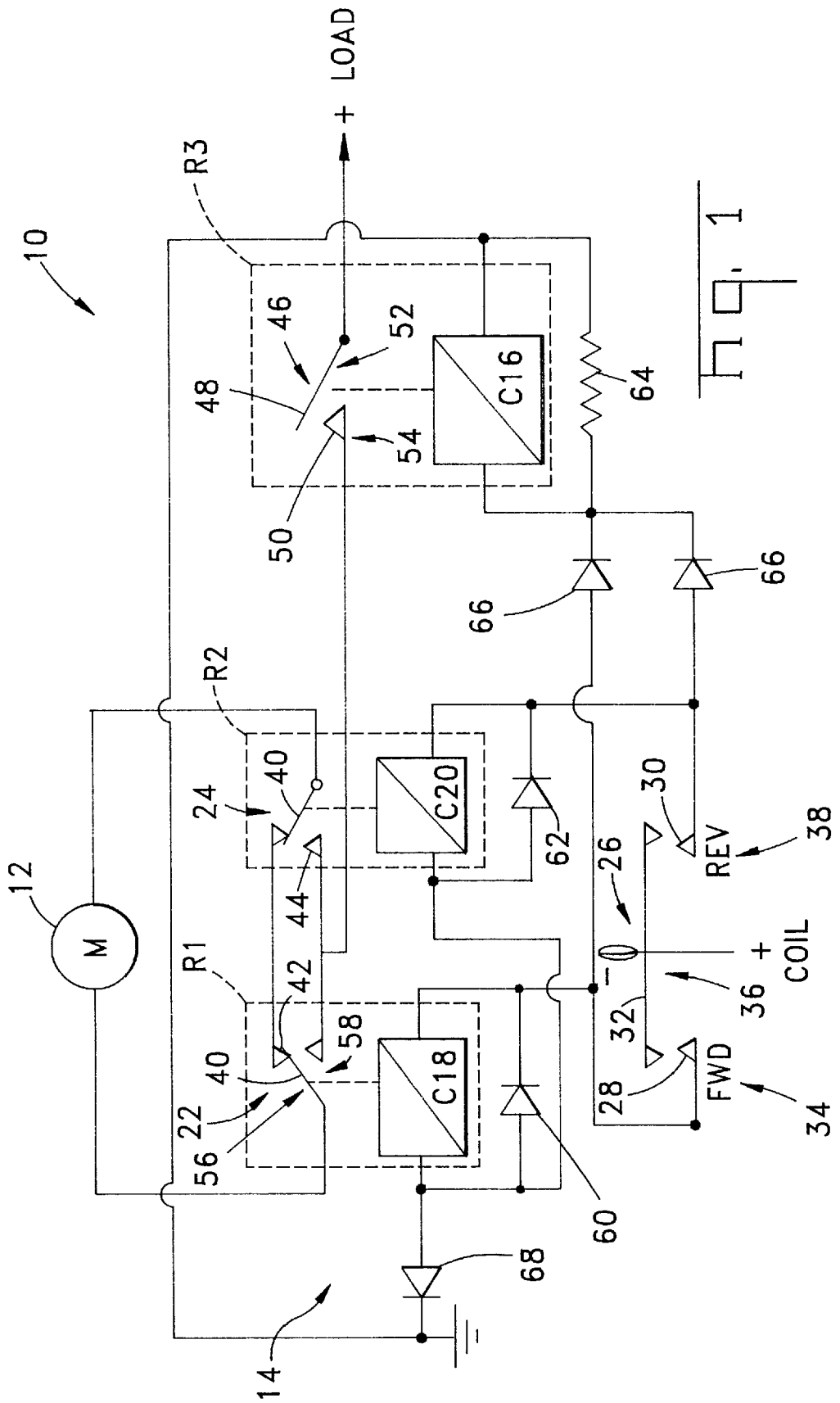
FIG. 1 is a schematic illustrating a motor reversing circuit in accordance with the present disclosure.

A preferred embodiment of the presently disclosed motor reversing circuit will now be described in detail with reference to FIGS. 1–4. While the preferred embodiment of the motor reversing circuit of the present disclosure is designed for automotive applications, such as the operation of power door locks, power seats, and power windows, the presently disclosed motor reversing circuit can be used in any application utilizing a bi-directional dc motor for operating a load (not shown) in a forward and reverse direction.

Motor reversing circuit 10 includes a motor 12, an H-bridge configuration 14, and an on/off relay R3. The H-bridge configuration 14 includes a forward relay R1, with a first set of first single pole, double throw (SPDT) contacts 22, a reverse relay R2 with a second set of single pole, double throw (SPDT) contacts 24, and an operating switch 26.

The motor 12 is coupled to the SPDT relay contacts 22, 24 to provide forward and reverse operations of the load as operating switch 26 is thrown to engage a forward contact 28 or reverse contact 30, as further described below. The operating switch 26 includes a movable contact 32 which is moveable from a forward position 34, to a center position 36, and to a reverse position 38. In the forward position 34, the movable contact 32 engages forward contact 28. In the reverse position 38, the movable contact 32 engages reverse contact 30. In the center position 36, the movable contact 32 engages neither the forward contact 28 or the reverse contact 30.

Each SPDT relay contact set 22, 24 includes a movable contact 40 which pivots from a normally closed (N.C.) stationary contact 42 to a normally open (N.O.) stationary contact 44 as the operating switch 26 is moved from the forward position 34, to the center position 36, and to the reverse position 38.

The on/off relay R3 controls relay contact set 46 which includes a movable contact 48 and a stationary contact 50. The movable contact 48 pivots from a non-contacting position 52 to a contacting position 54 to engage stationary contact 50 to provide an electrical connection between the load and the motor reversing circuit 10. The coil C16 of the on/off relay 16 is parallel to both H-bridge relay coils, such that it is energized whenever either of the H-bridge relays R1, R2 are energized.

Figure 2:
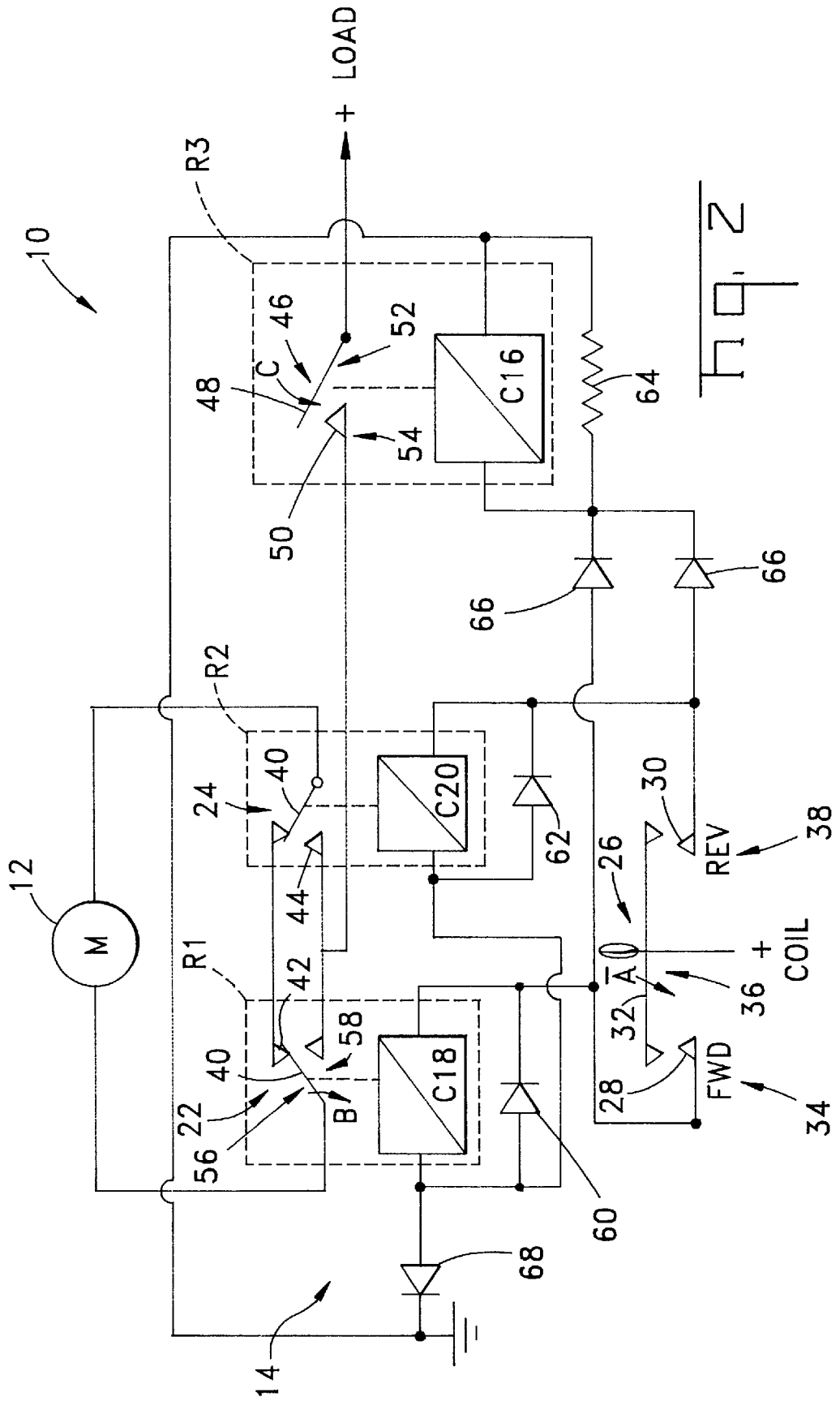
FIG. 2. is a schematic illustrating the motor reversing circuit of FIG. 1 effectuating forward operation of a load.

The operation of the motor reversing circuit 10 will now be described in detail with reference to FIGS. 2–4. FIG. 2 illustrates forward operation of the load. Forward operation of the load is effectuated by moving the operating switch 26 from the center position 36 to the forward position 34, as shown by arrow "A", such that moveable contact 32 engages forward contact 28. When moveable contact 32 engages forward contact 28, current is simultaneously supplied from a power source (not shown) to the forward relay R1 and the on/off relay R3. The current supplied by the power source enables an electromagnetic force to be created at the forward relay R1 and on/off relay R3.

The electromagnetic force created at the forward relay R1 magnetically pulls the movable contact 40 of the first SPDT switch 22 from a N.C. position 56 to a N.O. position 58 to engage N.O. stationary contact 44, as shown by arrow "B", to apply a positive voltage to one side of the motor 12. The other side of the motor 12 remains grounded through the N.C. position 56 of the second SPDT switch 24.

With continued reference to FIG. 2, the electromagnetic force created at the on/off relay R3 pulls the movable contact 48 of switch 46 from the non-contacting position 52 to the contacting position 54, as shown by arrow "C", to provide a load current to the motor 12 via moveable contact 40 of the first SPDT switch 22. The respective coils C18 and C16 of the forward relay R1 and on/off relay R3 remain energized as long as the moveable contact 32 is engaging the forward contact 28.

Figure 3:
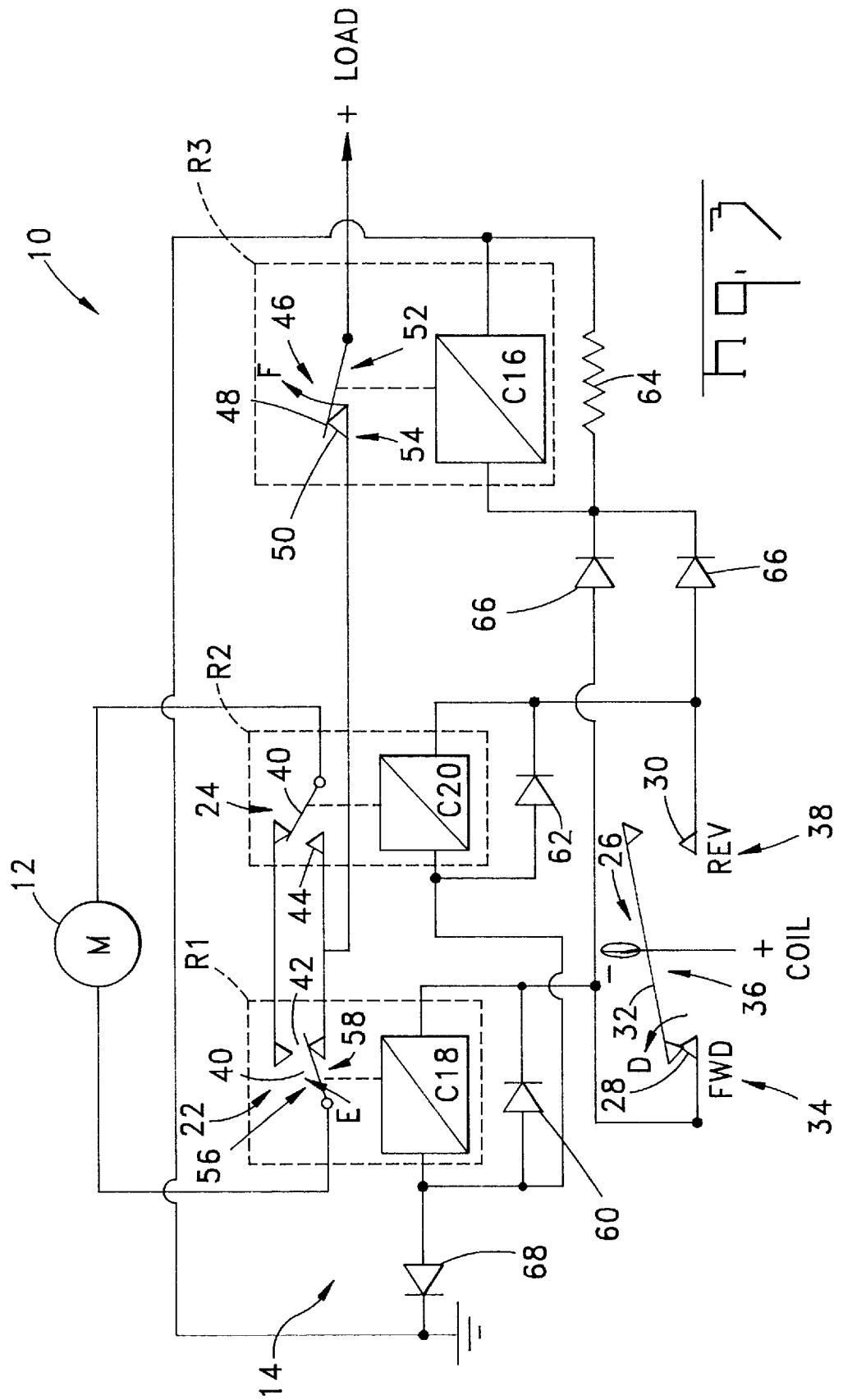
FIG. 3 is a schematic illustrating the motor reversing circuit of FIG. 1 effectuating removal of power from the load.

Deenergization of the respective coils C18 an C16 of the forward relay R1 and on/off relay R3 is achieved by bringing the moveable contact 32 from the forward position 34 to the center position 36 as shown by the schematic of FIG. 3. When the moveable contact 32 is brought to the center position 36 the current being supplied to the forward relay R1 and the on/off relay R3 by the power source is cut-off due to the break in the circuit, as shown by arrow "D".

When the current being supplied to the motor reversing circuit 10 is cut off, the forward relay R1 is deenergized. At deenergization, a first suppression diode 60 in parallel with the forward relay R1 allows the current to be recirculated through the relay coil C18. The first suppression diode 60 in effect provides diode suppression of the forward relay 18. This slows the collapse of the magnetic field and in turn slows the drop out of the moveable contact 40 of the first SPDT switch 22 from the N.O. position 58 to the N.C. position 56, as shown by arrow "E".

Also during deenergization of the forward relay R1, the on/off relay R3 is suppressed by a resistor 62 or other surge suppressor in parallel to the on/off relay R3 and having a greater impedance than the first suppression diode 60. This enables the on/off relay R3 to drop out significantly faster on deenergization than the forward relay R1, as shown by arrow "F". Switch 46 opens before the opening of switch 22 to the N.O. position 58. Thus, the on/off relay R3 cuts-off or interrupts the load current before the first SPDT switch 22 begins to switch to the N.C. stationary contact 42. This prevents arcing through the gap between the movable contact 40 and the N.O. stationary contact 44 in the H-bridge relay.

Figure 4:
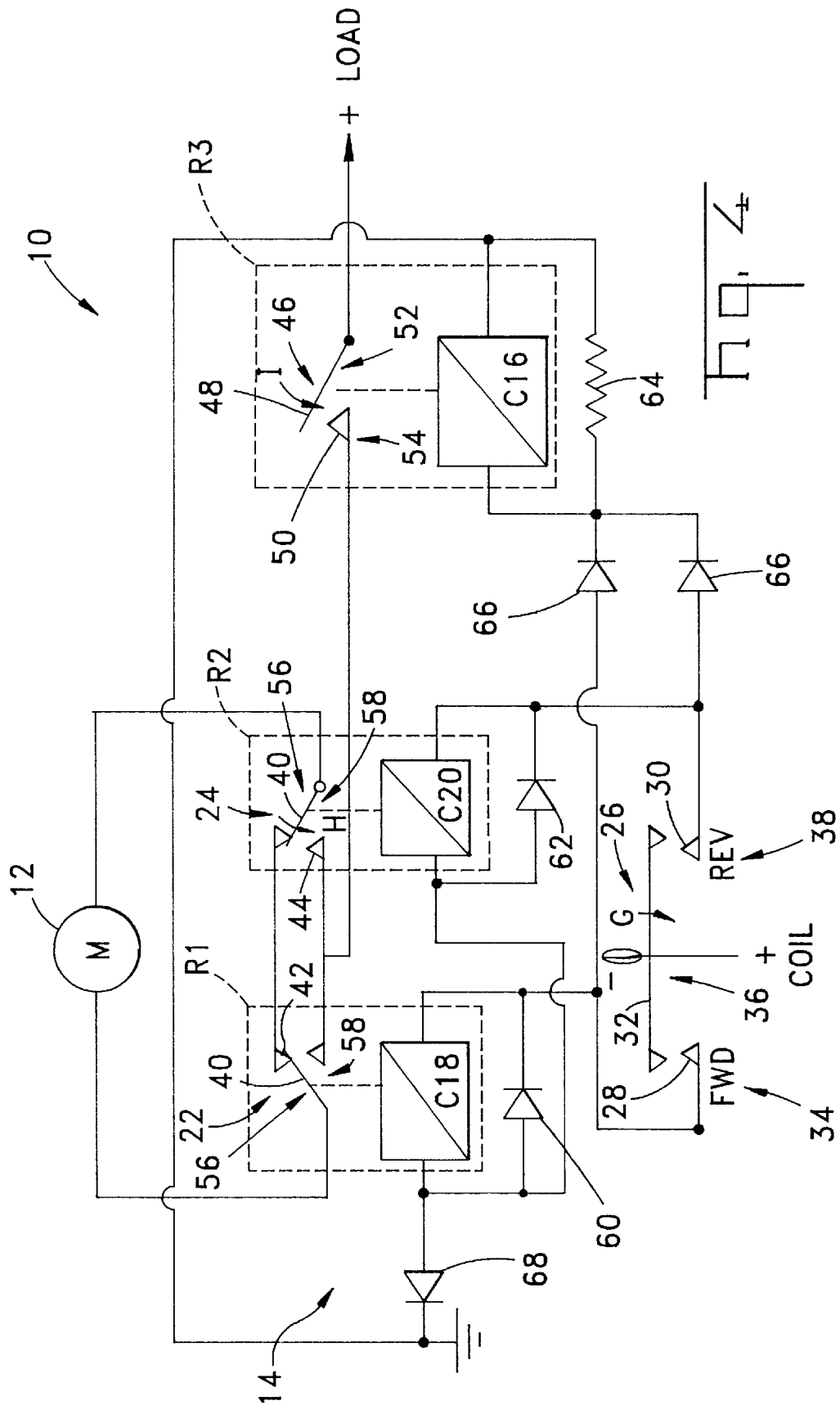
FIG. 4 is a schematic illustrating the motor reversing circuit of FIG. 1 effectuating reverse operation of the load.

With reference now to FIG. 4, there is shown a reverse operation of the motor reversing circuit 10. Reverse operation of the load is effectuated by moving the operating switch 26 from the center position 36 to the reverse position 38, as shown by arrow "G", such that moveable contact 32 engages reverse contact 30. When moveable contact 32 engages reverse contact 30, current is simultaneously supplied from the power source to the reverse relay R2 and the on/off relay R3. The current supplied by the power source once again enables an electromagnetic force to be created. However, this time the electromagnetic force is created at the reverse relay R2 and on/off relay R3.

The electromagnetic force created at the reverse relay R2 magnetically pulls the movable contact 40 of the second SPDT switch 24 from the N.C. position 56 to the N.O. position 58 to engage stationary contact 44, as shown by arrow "H", to apply a positive voltage to one side of the motor 12. The other side of the motor 12 remains grounded through the N.C. position 56 of the first SPDT switch 22.

With continued reference to FIG. 4, the electromagnetic force created at the on/off relay R3 pulls the movable contact 48 of switch 46 from the non-contacting position 52 to the contacting position 54, as shown by arrow "I", to provide the load current to the motor 12 via movable contact 40 of the second SPDT switch 24. The respective coils C20 and C16 of the reverse relay R2 and on/off relay R3 remain energized as long as the moveable contact 32 is engaging the reverse contact 30.

Deenergization of the coils of the reverse relay R2 and on/off relay R3 is achieved by bringing the moveable contact 32 from the reverse position 38 to the center position 36. When the moveable contact 32 is brought to the center position 36 the current being supplied to the reverse relay R2 and on/off relay R3 by the power source is cut-off due to the break in the circuit.

Similarly, as with the operation of the forward relay R1, when the current being supplied to the motor reversing circuit 10 is cut off, the reverse relay R2 is deenergized. At deenergization, a second suppression diode 62 in parallel with the reverse relay R2 allows the current to be recirculated through the relay coil C20. The second suppression diode 62 diode suppresses the reverse relay R2 to slow the collapse of the magnetic field and in turn slows the drop out of the moveable contact 40 of the second SPDT switch 24 from the N.O. position 58 to the N.C. position 56.

Also during deenergization of the reverse relay R2, the on/off relay R3 is suppressed by resistor 64 in parallel to the on/off relay R3 and having a greater impedance than the second suppression diode 62. This enables the on/off relay R3 to drop out significantly faster on deenergization than the reverse relay R2. Thus, the on/off relay R3 cuts-off the load current before the second SPDT switch 24 opens. Once again, this prevents arcing in the H-bridge relay.

The forward and reverse relays R1, R2 are isolated from each other by a pair of blocking diodes 66. An additional diode 68 is provided in the motor reversing circuit 10 to eliminate a path from ground, to the on/off relay R3, through the first 60 or second suppression diode 62, and back to the positive side of the on/off relay R3.

It is contemplated to use a VKP or other form "A" relay with a magnetic blow-out feature in the on/off relay function which would allow motor reversing circuit 10 to operate at still higher system voltage, including but not limited to 48-volt dc systems. As is known to one skilled in the art, as current flows through ionized gasses of an arc or other conductor, a magnetic field around the conductor is created. In a magnetic blow-out system a permanent magnet is placed perpendicular to the direction of current flow, with the appropriate pole of the magnet such that it opposes the magnetic field created by the current flowing in the arc. The magnet exerts a force on the conductor (the ionized gasses), forcing it away from the magnet. This artificially increases the contact gap by forcing the arc to follow an increasingly longer path until it is of such length that the arc cannot be sustained.

However, the magnetic blow-out feature cannot be incorporated to the relays in the conventional H-bridge circuit because the effect is not immediate and the arc occurs across the gap of the H-bridge relay. This occurs because there is positive supply voltage on one stationary contact and negative supply voltage on the other stationary contact. Therefore, the current in the arc may rise to hundreds of amperes very rapidly. At high current levels the arc cannot be extinguished even by the magnetic blow-out system. The magnetic blow-out feature is suitable in the on/off relay R3 of the presently disclosed motor reversing circuit 10 because the current flow through the arc of switch 46 is limited to the load current. This is due to the fact that positive and negative supply voltages are not present on opposite stationary contacts (as there is no N.C. stationary contact) and therefore a short circuit cannot be created through the arc. The magnetic blow-out feature enables the motor to be operated at voltage levels in the range of 20–350 volts.

It will be understood that various modifications may be made to the embodiments disclosed herein and that the above description should not be construed as limiting, but merely as exemplifications of preferred embodiments. Those skilled in the art will envision other modifications within the scope and spirit of the claims appended hereto.

What is claimed is:

1. A relay circuit for operating a motor, comprising:
   a first relay that is energized to engage a first connection of the motor to a power source to operate the motor in a first mode;
   a first suppression device for de-energizing the first relay at a first de-energizing rate;
   a second relay that is energized to provide a second connection of the motor to the power source to operate the motor in a second mode;
   a second suppression device for de-energizing the second relay at a second de-energizing rate;
   a switch having a movable contact to selectively engage one of a first contact position to supply power to the first relay for energizing the first relay, a second contact position to supply power to the second relay for energizing the second relay, and a neutral position where power is not supplied to the first and second relays;
   a third relay that is energized concurrently with the energizing of one of the first relay and the second relay to provide a third connection between the power source and one of the first connection and the second connection, respectively; and
   a third suppression device for de-energizing the third relay at a third de-energizing rate, the third de-energizing rate being greater than the first and second de-energizing rates, wherein when the movable contact of the switch is moved from the first contact position to the neutral position, the third relay is de-energized faster than the first relay so as to disengage the third connection before the first connection, and wherein, when the movable contact of the switch is moved from the second contact position to the neutral position, the third relay is deenergized faster than the second relay so as to disengage the third connection before the second connection.

2. The relay circuit of claim 1, further comprising a first blocking diode to electrically isolate the first and second relays when the second relay engages the second connection; and a second blocking diode to electrically isolate the first and second relays when the first relay engages the first connection.

3. The relay circuit of claim 1, wherein the first suppression device is a diode connected in parallel with the first relay and wherein the second suppression device is a diode connected in parallel with the second relay.

4. The relay circuit of claim 3, wherein the third suppression device is a resistor having and impedance that is greater than an impedance of the first suppression device and an impedance of the second suppression device.

5. The relay circuit of claim 1, further comprising a magnet in proximity to the third relay wherein a pole of the magnet opposes a magnetic field of an arc current that is generated when the third connection is disengaged.

6. The relay circuit of claim 2, further comprising a third diode, connected between a ground terminal and the first and second relays, for eliminating a path from ground to the third relay through the first and second blocking diodes upon de-energizing of the third relay.

7. The relay circuit of claim 1, wherein the motor operates at voltage levels in the range of about 20 volts to about 350 volts.

8. A circuit for selectively connecting a power source to a device, the circuit comprising:
   an H-bridge relay circuit comprising
      a first relay that is energized to create a first connection between the device and a first node;
      a first diode, connected in parallel with the first relay, for suppressing the first relay upon de-energizing of the first relay;
      a second relay that is energized to create a second connection between the device and the first node; and
      a second diode, connected in parallel with the second relay, for suppressing the second relay upon de-energizing of the second relay;
   a third relay that is energized to create a third connection between the first node and the power source;

a resistor connected in parallel with the third relay for suppressing the third relay upon de-energizing of the third relay; and a switch that operates to one of (a) simultaneously connect power to the first and third relays to energize the first and third relays and operate the device motor in a first mode, (b) simultaneously disconnect power from the first and third relays to de-energize the first and third relays, (c) simultaneously connect power to the second and third relays to energize the second and third relays and operate the device in a second mode, and (d) simultaneously disconnect power from the second and third relays to de-energize the second and third relays;

wherein, when the switch operates to simultaneously disconnect power from the first and third relays and de-energize the first and third relays, the resistor and first diode respectively suppress the third and first relay at disparate rates so as to disengage the third connection before the first connection, and wherein, when the switch operates to simultaneously disconnect power from the second and third relays and de-energize the second and third relays, the resistor and the second diode respectively suppress the third and second relay at disparate rates so as to disengage the third connection before the second connection.

9. The circuit of claim 8, further comprising a first blocking diode to electrically isolate the first and second relays when the second relay engages the second connection; and a second blocking diode to electrically isolate the first and second relays when the first relay engages the first connection.

10. The circuit of claim 8, wherein the resistor has an impedance that is greater than an impedance of each of the first and second diodes.

11. The circuit of claim 9, further comprising a third diode, connected between a ground terminal and the first and second relays, for eliminating a path from ground to the third relay through the first and second blocking diodes upon de-energizing of the third relay.

12. The circuit of claim 8, wherein the power source supplies dc voltage in the range of about 20 volts to about 350 volts.

13. The circuit of claim 8, further comprising a permanent magnet operatively associated with the third relay to prevent arc discharge between the first node and the third relay when the third connection is disengaged.

14. A circuit for operating a bi-directional motor comprising a first motor terminal and a second motor terminal, the circuit comprising:

a power source;

a first node, a second node and a ground node;

a switch comprising a movable contact connected to the power source, the switch having a forward position where the movable contact engages a forward contact, a reverse position where the movable contact engages a reverse contact and a center position where the movable contact is disengaged from the forward and reverse contacts;

an H-bridge relay circuit comprising a forward relay having a first positive coil terminal connected to the forward contact and a first negative coil terminal connected to the first node, wherein when the switch is in the forward position, the forward relay is energized for connecting the first motor terminal to the second node;

a first diode having first anode and a first cathode, the first diode being connected in parallel with the forward relay with the first anode being connected to the first node and the first cathode being connected to the forward contact, wherein the first diode de-energizes the forward relay at a second de-energizing rate when the switch is moved from the forward position to the center position;

a reverse relay having a second positive coil terminal connected to the reverse contact and a second negative coil terminal connected to the first node, wherein when the switch is in the reverse position, the reverse relay is energized for connecting the second motor terminal to the second node;

a second diode having a second anode and a second cathode, the second diode being connected in parallel with the reverse relay with the second anode being connected to the first node and the second cathode being connected to the reverse contact, wherein the second diode de-energizes the reverse relay at a second de-energizing rate when the switch is moved from the reverse position to the center position;

a third diode having a third anode connected to the first node and a third cathode connected to the ground node;

a fourth diode having a fourth anode connected to the forward contact and a fourth cathode;

a fifth diode having a fifth anode connected to the reverse contact and a fifth cathode; an on-off relay having a third positive coil terminal connected to the fourth and fifth cathodes and a third negative coil terminal connected to the ground node, wherein when the switch is in one of the forward position and the reverse position, the on-off relay is energized for connecting the second node to the power source; and a suppression device connected between the third positive and third negative coil terminals for de-energizing the on-off relay at a third de-energizing rate, wherein the third de-energizing rate is greater than the first and second de-energizing rates.

15. The circuit of claim 14, wherein the suppression device is a resistor having an impedance that is greater than an impedance of the first and second diodes.

16. The circuit of claim 14, further comprising a magnet in proximity to the on-off relay wherein a pole of the magnet opposes a magnetic field of an arc current that is generated upon disconnecting the power source from the second node.

17. The circuit of claim 14, wherein the power source supplies voltage in the range of about 20 volts to about 350 volts.

* * * * *